No. 628,221. Patented July 4, 1899.
A. E. HALL.
HAME AND TRACE CONNECTOR.
(Application filed June 23, 1898.)
(No Model.)
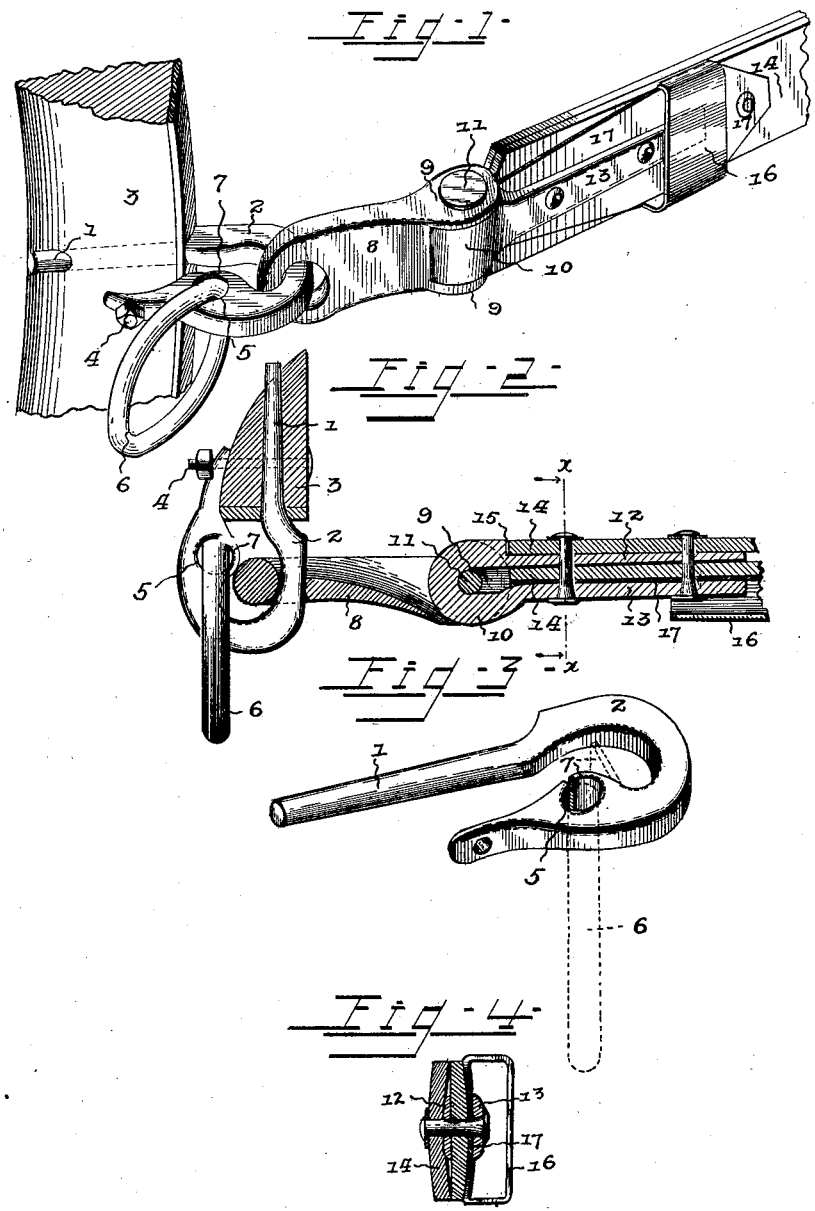
Witnesses:- Albert E. Hall, Inventor:-
By his Attorneys,

United States Patent Office.

ALBERT E. HALL, OF KEARNEY, NEBRASKA.

HAME AND TRACE CONNECTOR.

SPECIFICATION forming part of Letters Patent No. 628,221, dated July 4, 1899.

Application filed June 23, 1898. Serial No. 684,289. (No model.)

*To all whom it may concern:*

Be it known that I, ALBERT E. HALL, a citizen of the United States, residing at Kearney, in the county of Buffalo and State of Nebraska, have invented a new and useful Hame-Fastener, of which the following is a specification.

This invention has relation to means for connecting hame-tugs and holdback-rings to hames, the object being to provide fastenings of simple and effective construction and which will admit of the tugs or traces and holdback being quickly and easily removed or disconnected from the hame when required.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of the coupling means intermediate of the hame and tug. Fig. 2 is a plan section thereof. Fig. 3 is a detail view of the hame-clip, the dotted lines showing the position of the lip prior to bending it over the holdback-ring to secure the latter in the notch of the bill portion of the hame-clip. Fig. 4 is a transverse section about on the line X X of Fig. 2, looking to the rear.

Corresponding and like parts are referred to in the following description and indicated in the views of the drawings by the same reference characters.

The hame-clip comprises a shank 1 and hook 2, the shank being fitted into an opening provided in the hame 3 and the bill portion of the hook overlapping the front side of the hame and secured thereto by a bolt, pin, or like fastening 4. The bill portion of the hook is deflected slightly to one side of a plane passing horizontally through the shank 1, so as to enable the fastening 4 to clear the said shank and not interfere therewith. The bill portion of the hook is formed with a notch 5 at its inner side about midway of its ends to receive the holdback-ring 6, and a lip or extension 7 is formed with the said bill and is adapted to be bent around the holdback-ring 6 and retain it within the notch 5. The hame-clip can be easily disengaged from the hame by removing the fastening 4 and withdrawing the shank 1 from its opening in the hame.

The draft-clip 8 receives the hame-clip, and its rear portion is formed with parallel ears 9, between which is received the forward end of the tug-clip 10, said ears being apertured for the passage therethrough of a bolt or pin 11. The tug-clip has its front portion widened, so as to secure an extended engagement with the bolt or pin 9, whereby it is prevented from wearing out rapidly. This clip 10 is formed by doubling a suitably-formed blank upon itself, whereby parallel members 12 and 13 are provided, the inner member 12 being of less thickness than the outer member 13, so as to be secured between the layers comprising the tug 14. A shoulder 15 is formed at the front end of the member 12, and is of a depth corresponding to the thickness of the inner layer of the tug, so as to secure a flush joint between the tug and clip at the inner side, whereby chafing of the animal and parts of the harness is obviated.

The tug-loop 16 has its base portion extended at its ends, as shown at 17, and apertured for the reception of rivets or like fastenings by means of which the parts are connected. The forward extension 17 of the tug-loop comes between the outer side of the tug 14 and the member 13 of the tug-clip and is provided with openings in coincident relation with corresponding openings in the members of the tug-clip and in the layers of the tug, whereby the same fastenings secure these parts together.

Upon withdrawing the bolt or fastening 11 the tug 14 and the parts secured directly thereto may be uncoupled from the draft-clip 8, and if it be required to disconnect the draft-clip and holdback-ring from the hame it is only necessary to loosen the fastening 4 and withdraw it from engagement with the hame, when the hame-clip can be drawn outward and the desired uncoupling of the parts effected.

Having thus described the invention, what is claimed, and desired to be secured by Letters Patent, is—

1. In means for securing hame-tugs and holdback-rings to hames, a hame-clip having a shank fitted into an opening of the hame, and having a hook overlapping the front side of the hame and about in the same horizontal plane with the shank and having the hook formed with an inner notch and a lip at one side of the notch, and a fastening passing through an opening of the overlapping portion of the hook and securing the hame-clip to the hame, in combination with a holdback-ring fitted into the notch of the hook and secured in place by having the lip bent thereover.

2. In a hame-tug fastening, the combination with the tug formed of a number of layers, of the tug-clip comprising a folded end portion and parallel members, the inner member coming between the layers of the tug and having a shoulder to abut against the end of the inner layer, a plate fitted against the tug and coming between it and the outer member of the tug-clip and formed between its ends with a tug-loop, and fastenings passing through openings in coincident relation in the layers of the tug, the members of the tug-clip, and the said plate, and securing them together, substantially as set forth.

In testimony that I claim the foregoing as my own I have hereto affixed my signature in the presence of two witnesses.

ALBERT E. HALL.

Witnesses:
FRANK E. BEEMAN,
JUNIUS I. BOYLE.